United States Patent
Kruepke et al.

(10) Patent No.: US 6,173,506 B1
(45) Date of Patent: Jan. 16, 2001

(54) ROASTER

(75) Inventors: Annette T. Kruepke, Jackson; William C. Dobson, West Bend, both of WI (US)

(73) Assignee: Premark WB Holdings, Inc., Wilmington, DE (US)

(*) Notice: Under 35 U.S.C. 154(b), the term of this patent shall be extended for 0 days.

(21) Appl. No.: 09/301,815

(22) Filed: Apr. 29, 1999

(51) Int. Cl.⁷ .................................................. F26B 21/06
(52) U.S. Cl. ............................ 34/68; 34/225; 34/233; 426/467
(58) Field of Search ............................ 34/63, 68, 95, 34/109, 196, 197, 211, 225, 233; 99/421 H, 467, 469, 483; 426/466, 467, 494

(56) References Cited

U.S. PATENT DOCUMENTS

| | | |
|---|---|---|
| D. 282,618 | 2/1986 | McBrien . |
| D. 284,538 | 7/1986 | Friz . |
| D. 295,489 | 5/1988 | Ayukawa . |
| D. 316,798 | 5/1991 | Munk . |
| 328,949 | 10/1885 | Kingery . |
| 344,597 | 6/1886 | Saint-Aubin . |
| D. 395,192 | 6/1998 | Fischer et al. . |
| 662,294 | 6/1900 | Okell . |
| 1,063,188 | 6/1913 | De Simone . |
| 1,345,477 | 7/1920 | Cappelli . |
| 1,604,058 | 10/1926 | Mager . |
| 1,896,230 | 2/1933 | Farago . |
| 2,168,797 | 8/1939 | Havis . |
| 2,212,120 | 8/1940 | Kneale et al. . |
| 2,282,708 | 5/1942 | Dantzig . |
| 2,325,683 | 8/1943 | Kayden . |
| 2,325,684 | 8/1943 | Kayden . |
| 2,348,066 | 5/1944 | Goldfine . |
| 2,389,577 | 11/1945 | O'Toole et al. . |
| 2,667,560 | 1/1954 | Clark . |
| 2,857,683 | 10/1958 | Schytil . |
| 2,859,116 | 11/1958 | Heimbs et al. . |
| 3,122,439 | 2/1964 | MacAllister et al. . |

(List continued on next page.)

FOREIGN PATENT DOCUMENTS

| | | |
|---|---|---|
| 573649 | 5/1985 | (AU) . |
| A26251/84 | 6/1985 | (AU) . |
| 843185 | 10/1976 | (BE) . |

(List continued on next page.)

* cited by examiner

*Primary Examiner*—Stephen Gravini
(74) *Attorney, Agent, or Firm*—Michael Best & Friedrich LLP

(57) ABSTRACT

A roaster and method for roasting utilizing a tangential flow reducing structure which directs and guides airflow from a blower device into a roasting vessel with minimal swirl and circular flow. The tangential flow reducing structure is preferably one or more baffles, and is preferably located within a plenum in the base of the roaster. More preferably, the roaster has a number of substantially vertical baffles channeling airflow into a vertical and reduced-swirl flow entering the roasting vessel. The roaster also preferably has a unique connection between the roasting vessel and a base upon which the roasting vessel rests, with a flat washer-shaped gasket maintaining a fluid tight seal between the roasting vessel and the base. To tighten the seal, the roaster also preferably includes a cover which is pivotably attached to a support structure supporting the cover in position over the roasting vessel when the roasting vessel is on top of the base. When the cover is in position covering the open top of the roasting vessel, it preferably exerts a light compressive force upon the roasting vessel, which in turn exerts a compressive force upon the gasket to create a better seal between the roasting vessel and the base. Preferably, both the roasting vessel and the roaster base have screens to prevent debris, coffee bean hulls, and other foreign matter from falling into the base. Also, the roaster is preferably provided with a chaff receptacle connected to the cover to collect such matter.

45 Claims, 10 Drawing Sheets

U.S. PATENT DOCUMENTS

| | | |
|---|---|---|
| 3,149,976 | 9/1964 | Smith, Jr. . |
| 3,153,377 | 10/1964 | Bosak . |
| 3,189,460 | 6/1965 | Smith, Jr. . |
| 3,285,157 | 11/1966 | Smith, Jr. . |
| 3,328,172 | 6/1967 | Smith, Jr. . |
| 3,329,506 | 7/1967 | Smith, Jr. . |
| 3,345,180 | 10/1967 | Smith, Jr. . |
| 3,553,850 | 1/1971 | Schuurink . |
| 3,615,668 | 10/1971 | Smith, Jr. . |
| 3,730,731 | 5/1973 | Smith, Jr. . |
| 3,964,175 * | 6/1976 | Slvetz ................................. 34/589 |
| 4,169,164 * | 9/1979 | Hubbard et al. ................... 426/467 |
| 4,178,843 | 12/1979 | Crabtree et al. . |
| 4,196,342 | 4/1980 | Chailloux . |
| 4,245,148 | 1/1981 | Gisske et al. . |
| 4,271,603 | 6/1981 | Moore, III . |
| 4,325,191 | 4/1982 | Kumagai et al. . |
| 4,326,114 | 4/1982 | Gerling et al. . |
| 4,425,720 | 1/1984 | Elevitch . |
| 4,455,763 | 6/1984 | Elevitch . |
| 4,484,064 * | 11/1984 | Murray ............................. 34/368 X |
| 4,489,506 | 12/1984 | Brown et al. . |
| 4,494,314 | 1/1985 | Gell, Jr. . |
| 4,591,508 | 5/1986 | Pultinas, Jr. . |
| 4,602,147 | 7/1986 | Gell . |
| 4,631,838 | 12/1986 | Eichler et al. . |
| 4,642,906 | 2/1987 | Kaatze et al. . |
| 4,683,666 | 8/1987 | Igusa et al. . |
| 4,687,909 | 8/1987 | Eichler et al. . |
| 4,698,916 | 10/1987 | Farber . |
| 4,737,376 | 4/1988 | Brandlein et al. . |
| 4,817,518 | 4/1989 | Wyatt et al. . |
| 4,841,849 | 6/1989 | Shimomura et al. . |
| 4,860,461 | 8/1989 | Tamaki et al. . |
| 4,871,901 | 10/1989 | Igusa et al. . |
| 4,875,904 | 10/1989 | Munk . |
| 4,895,308 | 1/1990 | Tanaka . |
| 4,925,682 | 5/1990 | Miya . |
| 4,939,988 | 7/1990 | Wyatt et al. . |
| 4,988,590 | 1/1991 | Price et al. . |
| 5,083,502 | 1/1992 | Enomoto . |
| 5,158,011 | 10/1992 | Chen . |
| 5,160,757 | 11/1992 | Kirkpatrick et al. . |
| 5,185,171 | 2/1993 | Bersten . |
| 5,205,274 | 4/1993 | Smith et al. . |
| 5,230,281 | 7/1993 | Wireman et al. . |
| 5,257,574 * | 11/1993 | Hiromichi ............................. 99/483 |
| 5,269,072 * | 12/1993 | Waligorski ........................ 34/233 X |
| 5,355,783 | 10/1994 | Cochran . |
| 5,359,788 | 11/1994 | Gell, Jr. . |
| 5,365,918 | 11/1994 | Smith et al. . |
| 5,387,256 | 2/1995 | Enomoto . |
| 5,500,237 | 3/1996 | Gell, Jr. et al. . |
| 5,564,331 * | 10/1996 | Song ................................. 34/233 X |
| 5,573,802 | 11/1996 | Porto . |
| 5,609,097 | 3/1997 | Newnan . |
| 5,632,098 * | 5/1997 | Finch ...................................... 34/63 |
| 5,718,164 | 2/1998 | Finken et al. . |
| 5,735,194 | 4/1998 | Cochran . |
| 5,749,288 | 5/1998 | Skaling . |
| 5,771,600 * | 6/1998 | Romanow ................................ 34/63 |
| 5,878,508 * | 3/1999 | Knoll et al. ........................ 34/197 X |
| 5,890,418 | 4/1999 | Song . |
| 5,943,790 | 8/1999 | Gell, Jr. . |
| 5,960,561 * | 10/1999 | Parodi et al. ...................... 34/218 X |

FOREIGN PATENT DOCUMENTS

| | | |
|---|---|---|
| 1227688 | 10/1987 | (CA) . |
| 2832743 | 2/1980 | (DE) . |
| 3300149 | 7/1984 | (DE) . |
| 0055462 | 7/1982 | (EP) . |
| 0060062 | 9/1982 | (EP) . |
| 0143646 | 6/1985 | (EP) . |
| 0676148A1 | 11/1995 | (EP) . |
| 2413018 | 7/1979 | (FR) . |
| 2454278 | 11/1980 | (FR) . |
| 2478956 | 10/1981 | (FR) . |
| 2071480 | 9/1981 | (GB) . |
| 2112626 | 7/1983 | (GB) . |
| 2119226 | 11/1983 | (GB) . |
| 2151124A | 7/1985 | (GB) . |
| 63-185360 | 3/1988 | (JP) . |
| 145148 | 6/1990 | (JP) . |
| 7801940 | 8/1979 | (NL) . |
| PCT/US83/ 01521 | 4/1984 | (WO) . |
| PCT/US96/ 01112 | 8/1997 | (WO) . |

ROASTER

FIELD OF THE INVENTION

The present invention relates to roasters, and more specifically, to apparatuses and methods for roasting coffee beans in a roasting vessel with primarily axial intake air flow.

BACKGROUND OF THE INVENTION

Over the past several decades, a number of advancements in the art of roasting coffee beans, nuts, and the like have taken place. For example, the introduction of relatively small kitchen-sized coffee bean roasters was a significant development in the art, permitting the roasting process to be performed at home rather than in a store or restaurant. As another example, it is now recognized that faster and better roasting is made possible through "fluidizing" during the roasting process. In other words, better results are achieved when the food items being roasted are circulated via air flow within a vessel (i.e., when such items are "fluidized") while being roasted.

Roasting food matter by fluidizing the food is, of course, limited to food matter which is in the form of a plurality of relatively small items. For example, roasters which fluidize an amount of food during the roasting process are commonly used to roast coffee beans, nuts, and the like. Therefore, although the remainder of this disclosure makes reference only to roasting coffee beans in a coffee bean roaster, it should be noted that the present invention can be used for roasting any food item in the form of multiple parts capable of being fluidized.

An important feature of most coffee bean roasters utilizing a fluidized bean roasting method is the manner in which the beans flow or are circulated within the roasting vessel. Each fluidizing design attempts, with mixed success, to achieve uniform bean circulation while keeping as many beans as possible floating within the roasting vessel. Notwithstanding the existence of several roaster designs in which coffee beans are fluidized during roasting, however, a roaster capable of fully fluidizing a charge of coffee beans with minimal air flow force and roasting beans in a uniform manner remains a somewhat elusive goal.

Another problem with conventional coffee bean roasters regards the connection commonly existing between the coffee bean roasting vessel (in which the coffee beans are placed and are contained during the roasting process) and the connected apparatus emitting the hot air flow for roasting coffee beans within the vessel. Typically, this connection is preferably relatively fluid tight so as to ensure adequate internal pressure between the connected apparatus and the coffee bean roasting vessel. A fluid tight connection helps to prevent pressure loss through the connection and reduces the chance of coffee beans, hulls, debris, etc. from exiting the roaster between the roasting vessel and the connected apparatus. The connection is also preferably designed to prevent coffee beans, hulls, and/or debris from falling from the coffee bean roasting vessel into the connected apparatus for those roaster designs in which the vessel rests atop an air emitting base or housing.

Many prior art coffee bean roasters have a permanently secured roasting vessel within the roaster and therefore do not have sealing arrangements which permit user insertion and removal of the roasting vessel. In those conventional coffee bean roasters which do have a removable roasting vessel, a fluid-tight seal between the vessel and the base or housing is typically created via an annular seal or bead surrounding a bottom portion of the roasting vessel or by a compression and gasket mechanism. The annular seal or bead arrangement is subject to wear with repeated insertion and removal of the roasting vessel, and depends heavily upon a precise fit between the roasting vessel and the base or housing. Compression and gasket mechanisms commonly used for removable roasting vessels are relatively complex and therefore are expensive to manufacture. As such, conventional sealing arrangements are generally less than optimal.

Also, conventional connection designs often either do not adequately protect against beans, hulls, or debris from falling into the apparatus connected to the roasting vessel, do so at the expense of a connection which is either difficult and expensive to manufacture or is hard to clean, or do not protect against waste and dust escaped during roasting from re-entering the roaster. Despite the large number of roaster designs which attempt to establish a sufficient vessel-to-base/housing seal and to prevent matter from falling or being drawn via air intake into the base or housing connected to the roasting vessel, a simple, fully effective, reliable and easy to clean connection between the roasting vessel and the base or housing has not been introduced.

In light of the problems and limitations of the prior art described above, a need exists for a coffee bean roaster in which improved airflow ensures better coffee bean roasting results, which utilizes a reliable and easily cleaned and manufactured seal between the roasting vessel and its base or housing, and which protects components (such as a fan, heater, and motor) within the base or housing from debris falling or being drawn into the base or housing or being drawn into the base or housing via air intake. Each preferred embodiment of the present invention achieves one or more of these results.

SUMMARY OF THE INVENTION

In the present invention, improved coffee bean roasting results are obtained by establishing a substantially axial and preferably vertical airflow into the roasting vessel creating fountain-like vessel flow. Unlike numerous prior art devices which either permit or attempt to generate an angled, swirl, or whirlwind flow of air into the roasting vessel to fluidize the bed of coffee beans therein, the present invention includes at least one element located upstream of the roasting vessel to prevent such flow. Preferably, the element is a series of baffle members located and oriented in such a manner as to guide air from the base or housing of the roaster into the roasting vessel in a substantially vertical direction (i.e., parallel to the axis of the roasting vessel) with reduced or no flow tangential to the vessel axis. Without the baffle members to guide the airflow into the roasting vessel in this way, the airflow into the roasting vessel is swirled or has a whirlwind effect generated by the fan or other conventional blower device in the roaster. By guiding the air via baffles or other flow guiding element as described above, airflow into the roasting vessel is preferably made uniform and has minimal swirl and tangential flow. The inventors have found that such flow into the roasting vessel produces unique coffee bean flow inside the roasting vessel and a uniform and improved coffee bean roasting effect.

In one preferred embodiment of the present invention, a plurality of baffles are secured in place between the roasting vessel and the roaster fan. The plurality of baffles are preferably arranged in a star shaped configuration and are each vertically oriented to define a series of vertical channels through which the air flows just prior to entering the roasting vessel. However, grid or other baffle patterns can also be used depending upon ease of manufacture, assembly, and other factors. In another preferred embodiment, two or more levels of such baffles are positioned one vertically above the other, with the levels of baffles most preferably being misaligned with respect to one another (e.g., in a star-shaped baffle arrangement, the arms of the star on each level are axially rotated with respect to the arms of the stars on other levels). Multiple baffle levels can be used to further remove swirl or whirlwind flow from the air forced by the fan prior to entry into the roasting vessel. In yet another embodiment, a flow plate secured between the roasting vessel and the roaster fan has a series of apertures therethrough which guide air into the roasting vessel with minimal to no swirl or whirlwind flow. The flow plate is preferably of a thickness substantial enough to prevent flow which is tangential to the axis of the vessel from entering the roasting vessel. However, to accomplish this same result, the flow plate can instead have a number of tubes extending from its surface and into the roasting vessel. Depending at least in part upon the design of the roaster fan and the direction of airflow generated thereby, a plenum plate can be located between the fan and the baffles, flow plate, tubes, or other flow control element. Airflow generated by the fan is preferably passed around the plenum plate and through or beside the baffles, flow plate, tubes, or other flow control element.

The present invention also preferably utilizes a unique connection arrangement between the roasting vessel and the base or housing from which air is heated and forced into the roasting vessel. In particular, a flat substantially washer-shaped gasket is preferably used to create a fluid-tight seal between the roasting vessel and the base or housing. When installed in the roaster, the open bottom end of the roasting vessel rests atop the gasket. The lip of the open bottom preferably rests upon the gasket, which itself is sealed to the base or housing to create the fluid-tight seal. The roaster is preferably provided with a top and a cover pivotably mounted to the top. When the cover is pivoted over the top of the roasting vessel and secured into place by a retaining member (such as a spring clip or lever), the cover exerts a light compressive force upon the roasting vessel which acts to better seal the open bottom end of the roasting vessel to the gasket, thereby ensuring a tight and reliable seal for the roaster. This preferred design not only requires much simpler and less expensive elements than prior art roasters, but also provides a connection which is more reliable and easier to clean.

In addition to the better sealing connection just discussed, the roasting vessel-to-base connection of the present invention is designed to prevent debris such as coffee bean fragments, hulls, etc. from entering the base or housing to which the roasting vessel is connected. Because the base and roasting vessel both have openings which are adjacent and through which air is forced and guided in a substantially vertical direction in the roasting process, it is desirable to minimize the number and impact of obstructions within the air flow path. The present invention therefore preferably has a screen covering the open bottom of the roasting vessel and a screen covering the opening in the base or housing. Although two screens are preferred, other embodiments of the present invention have only one of the two screens described. The use of a dual screen in the connection between the roasting vessel and the base or housing ensures that less debris enters the base or housing.

Many food types generate a significant amount of dust, chaff, or other particulate waste which is difficult to contain or filter. To protect against such matter re-entering the roaster through the roaster air intake hole(s), the roaster is preferably provided with an air intake filter covering the intake holes or otherwise located on the roaster to filter such matter from air entering the roaster.

The coffee bean roaster of the present invention can also have a filter in fluid communication with the inside of the roasting vessel via the cover of the roaster. Air and entrained chaff, dust, hulls, and debris from roasting preferably passes from the roasting vessel and into the filter located in a chaff receptacle connected to the roasting vessel.

More information and a better understanding of the present invention can be achieved by reference to the following drawings and detailed description.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF PREFERRED EMBODIMENTS

Figure 1:
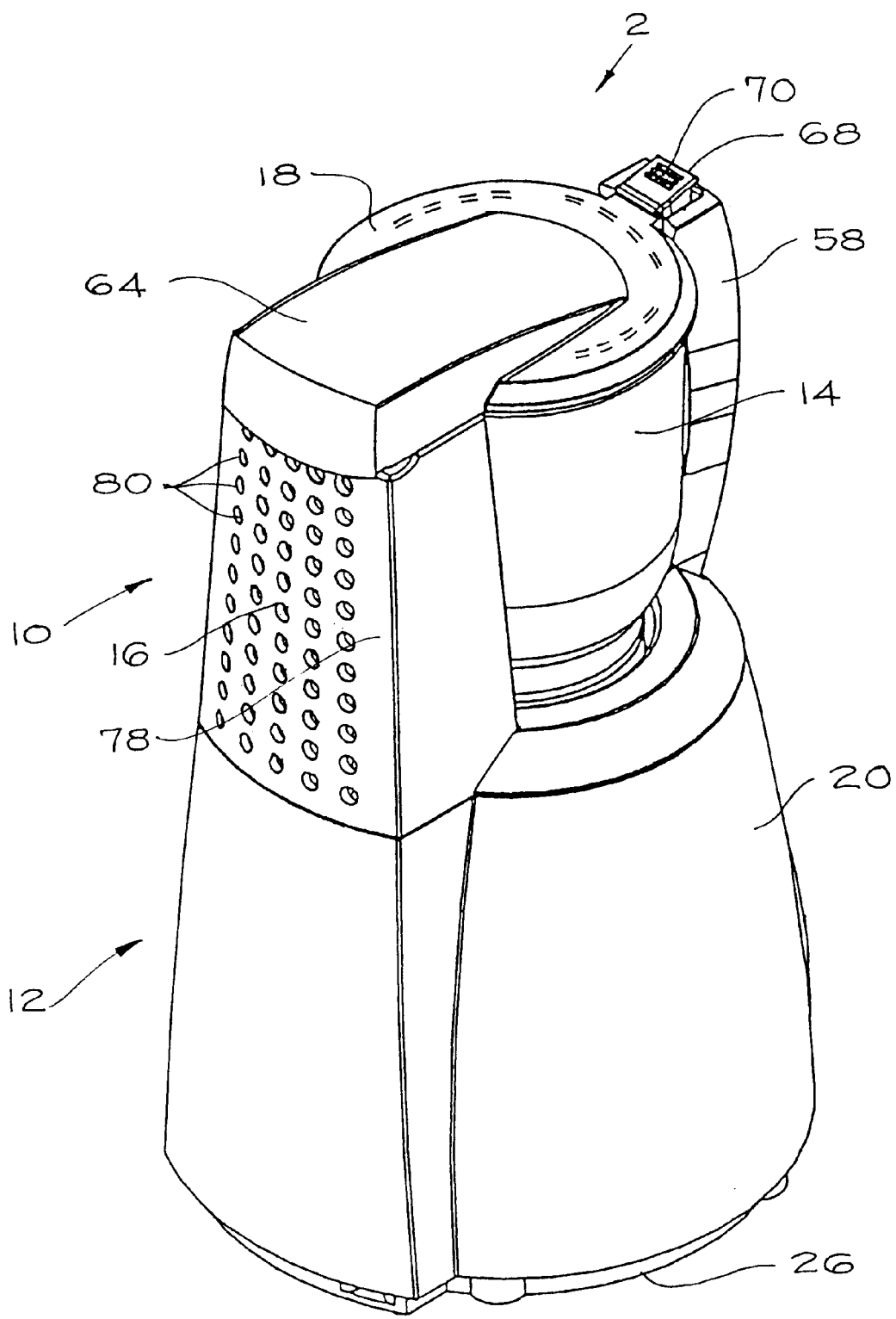
FIG. 1 is a perspective view of the coffee bean roaster according to a first preferred embodiment of the present invention, showing the cover of the roaster closed.
Figure 2:
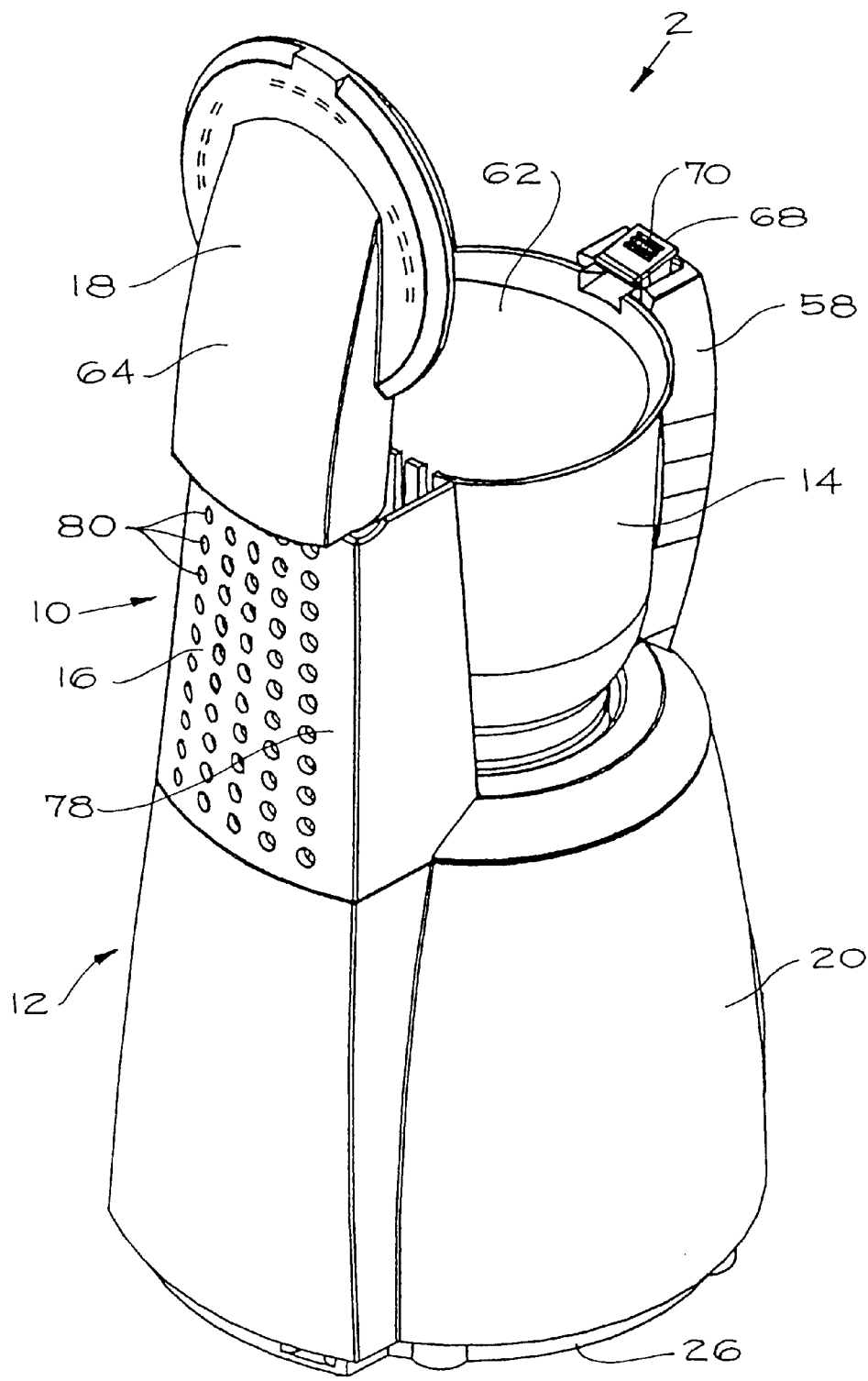
FIG. 2 is a perspective view of the coffee bean roaster of FIG. 1, showing the cover of the roaster open.

The coffee bean roaster of the present invention (indicated generally at 2) preferably has a top 10, a base 12, and a roasting vessel 14. The top 10 preferably includes a chaff receptacle housing 16 and a cover 18, while the base 12 preferably has a housing 20 within which air is heated and blown upwards into the roasting vessel 14 to cook a charge of coffee beans placed within the roasting vessel 14.

A motor 22 (powered by electricity from a wall outlet via a standard cord and plug assembly, battery, etc.) is preferably secured within the housing 20 and is connected to a fan 24 in a conventional manner. Preferably, the motor 22 is secured to a bottom 26 of the roaster 2 via conventional fasteners (not shown). To secure the fan 24 within the housing 20, the fan 24 can have a fan housing 28 also secured to the bottom 26 of the roaster 2 via conventional fasteners. It will be appreciated by one having ordinary skill in the art that the above-described manner in which the motor 22, fan 24, and fan housing 28 (if used) are secured within the housing 20 is presented herein only by way of example, and that several other well-known configurations and securement methods are possible and fall within the scope of the present invention.

Figure 6:
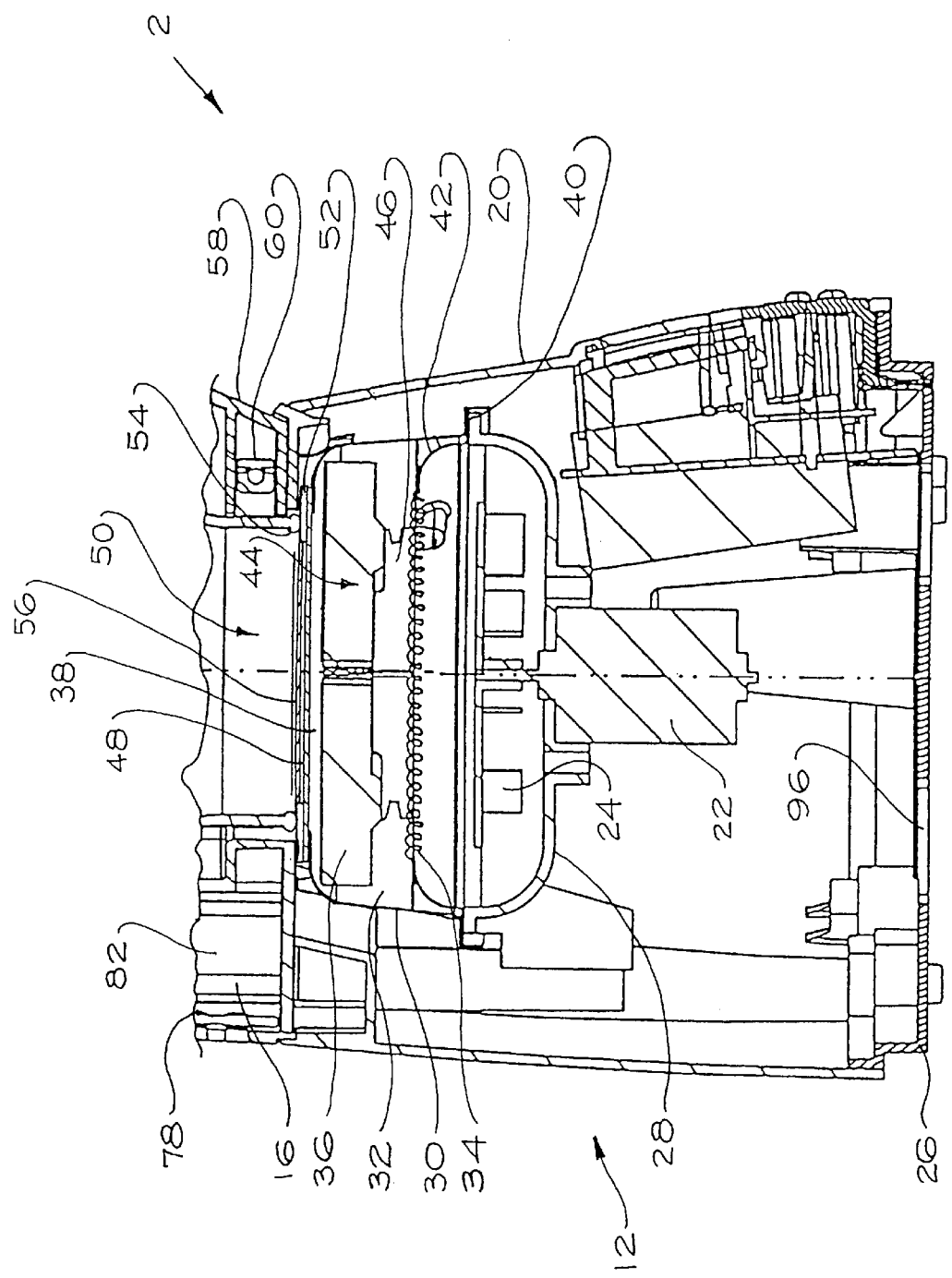
FIG. 6 is an detailed elevational view of the base top of the coffee bean roaster shown in FIGS. 1–5.

To better contain and direct air from the fan 24 to the roasting vessel 14, the base 12 of the roaster 2 is preferably provided with a plenum housing 30 which extends from around the fan 24 to a position at the top of the base 12. Where a fan housing 28 is used, the plenum housing 30 is attached in a conventional fashion thereto to enclose the fan 24 from behind to a position downstream of the fan 24. Alternatively, the fan housing 28 and the plenum housing 30 can be a single unit within which the fan 24 is enclosed on the sides and rear. As is best seen in FIG. 6, the plenum housing 30 defines a plenum 32—an enclosure open at the top and enclosing the fan 24, heating element 34, and baffles 36 as is further described below. When the fan 24 is turned by the motor 22, the plenum housing 30 acts to contain and direct the airflow generated by the fan 24 toward the base opening 38 and into the open bottom of the roasting vessel 14 to fluidize the coffee beans therein. Therefore, it is desirable that the plenum housing 30 and fan housing 28 are sealed against the passage of fluid (e.g., air) through anything but the base opening 38. Further, the plenum 32 preferably does not include any portions extending around sides of the roasting vessel 14 to reduce localized and unnecessary heating of lower portions of the roasting vessel 14.

To roast the coffee beans within the roasting vessel 14, the airflow generated by the fan 24 is heated by a heating element 34 within the plenum 32 prior to passing through the base opening 38. The heating element 34 is preferably a conventional electrical resistance element (such as a coil heater or plate heater) which is secured within the plenum 32 a distance above the fan 24. The heating element 34 can be secured a distance from the fan 24 in a number of manners well-known to those skilled in the art, such as by resting upon pins or a ledge extending inwardly from the plenum housing 30, by being suspended from supports which are themselves attached to the top of the plenum housing 30 or are part of the plenum housing 30, etc. However, in one preferred embodiment of the present invention illustrated in the figures, the heating element 34 is secured via conventional fasteners (not shown) atop a support ring 42 which itself is secured about its outer circumference between the plenum housing 30 and the fan housing 28. Preferably, the same fasteners used to secure the plenum housing 30 to the fan housing 28 also secure therebetween the support ring 42. To elevate the heating element 34 above the fan 24, the support ring 42 preferably has an inverted dish shape (without the dish center) as shown in FIGS. 3–6.

To ensure a fluid-tight seal between the fan housing 28, the support ring 42 and the plenum housing 30, it is preferred (although not required) to install housing gaskets 40 between the fan housing 28 and the support ring 42 and between the support ring 42 and the plenum housing 30. The housing gaskets 40 and their material of manufacture are conventional in nature.

The airflow generated by the fan 24 is inherently highly turbulent in nature, having swirls and whirlwinds throughout. If left uncontrolled, such flow is typically transmitted from the fan 24, downstream through the base opening 38, and into the roasting vessel 14. The swirling airflow pins certain portions of some beans against the high-temperature side of a roasting vessel, overheating such portions and creating an inhomogeneous roast. To control this flow, one embodiment of the present invention utilizes a number of baffles 36 which are preferably vertically oriented. As the airflow from the fan 24 passes the baffles 36, the airflow is vertically channeled and directed, and the components of airflow which are tangential to the axis of the roasting vessel 14 are reduced or eliminated. This type of structure acts not only to direct the flow in a uniform manner, but also removes a large amount of turbulence such as swirling and whirlwind effects from the airflow. Airflow exiting the baffles 36 and entering the roasting vessel 14 therefore is more uniform and controlled to impart a controlled airflow force upon coffee beans within the roasting vessel 14. This results in a unique and improved ability to circulate and roast coffee beans within the roasting vessel 14.

Figure 9:
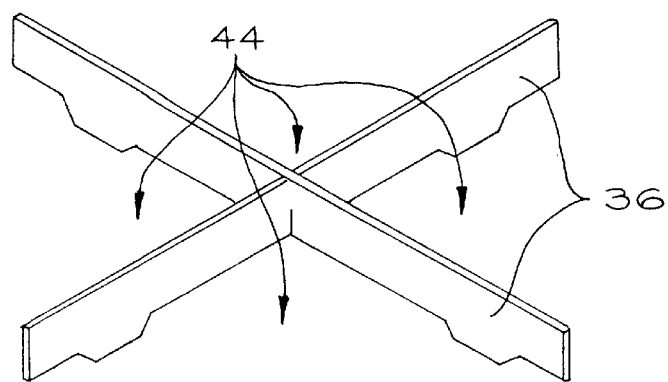
FIG. 9 is a perspective view of the baffles of the coffee bean roaster shown in FIGS. 1–8.

As shown in FIG. 9, the baffles 36 are preferably arranged in a star shape, each being connected at the center of the star shape to define a series of channels 44 through which the airflow passes. The baffles 36 can be a number of plates secured such as by welding, riveting, etc. to one another at one end, or can instead be a series of longer plates notched at their centers to fit one within the other to arrive at the same star-shaped arrangement. It will be appreciated by one having ordinary skill in the art that the baffles 36 can be secured to one another in a large number of ways to produce the same or a similar baffle structure as illustrated in FIG. 9. It will also be appreciated that the baffles 36 can take any number of shapes (oval, circular, triangular, etc.) beyond the generally rectangular shapes illustrated in FIG. 9, and that the number of baffles 36 making up the baffle structure can vary from a very large number to as few as one. In this regard, the baffle structure and the number of baffles 36 employed in the baffle structure depend heavily upon a number of factors such as flow speed, the distance from the fan 24 to the baffles 36, and baffle size and shape. Another variable which is dependent upon these factors is the width of the baffles 36. In general, longer channels 44 can result in more uniform and controlled flow exiting the channels 44 and entering the roasting vessel 14. Therefore, a balance must be achieved between the desired maximum height of the roaster 2 and the baffle width.

Other preferred embodiments of the present invention utilize different baffle structure arrangements. For example, rather than use the star shaped baffle arrangement as illustrated in FIG. 9, the baffles 36 can instead be arranged in a grid form if desired.

Figure 10:
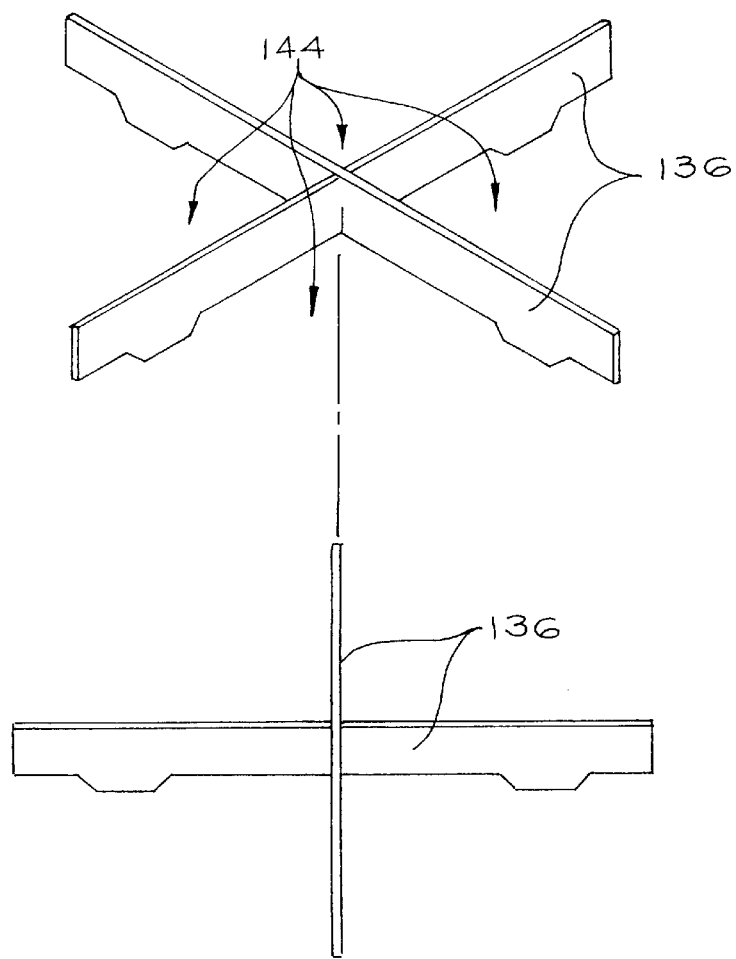
FIG. 10 is an exploded perspective view of the baffles according to a second preferred embodiment of the present invention.

In an alternate embodiment of the present invention illustrated in FIG. 10, multiple baffle levels are used to better control the airflow to the roasting vessel 14. Each baffle structure is substantially the same as the baffle structure illustrated in FIG. 9. One baffle structure is axially aligned with and preferably abuts the second baffle structure. Also preferably, the baffles 136 of each baffle structure are misaligned with respect to one another. In other words, the channels 144 defined by the baffles 136 are not continuous through the first and second baffle structures, but are broken by the relative angular misalignment of the baffles 136 in each baffle structure. Such misalignment acts to further lower spiral and whirlwind flow entering the roasting vessel 14. Although the baffle structures shown in FIG. 10 are both star shaped, it should be noted that mixed baffle structure types (e.g., one star shaped and one grid shaped) can also be employed. Also, even more levels of baffles 136 can be used within the roaster 2.

The baffles 36, 136, can be secured within the plenum 32 in a number of manners well-known to those skilled in the art. For example, the baffles 36, 136 can be secured via conventional fasteners, welding, etc. to the plenum housing 30, or can even be formed as a part thereof, can rest upon pins or ledges which extend from the plenum housing 30, or can be fastened via conventional fasteners directly to the heating element 34 to be supported thereby. In the preferred embodiment of the present invention as illustrated in FIGS. 4–8, the baffles 36 are preferably supported upon the heating element 34 via a cross-support 46. The cross support 46 engages holes in the heating element 34 and has notches which mate snugly onto the baffles 36, thereby supporting the baffles 36 in raised relationship over the heating element 34.

It should be noted that in order to practice the invention, the baffles 36, 136 need not be used in conjunction with a plenum housing 30, or even with a base 12 such as that shown in FIGS. 1–8. An important aspect of the present invention rests in the use of baffles 36, 136 to create a substantially vertical airflow into the roasting vessel 14 for the unique and improved roasting vessel flow described herein. Optional additional features include particular housing or base structures and manners of supporting the baffles 36, 136.

Figure 11:
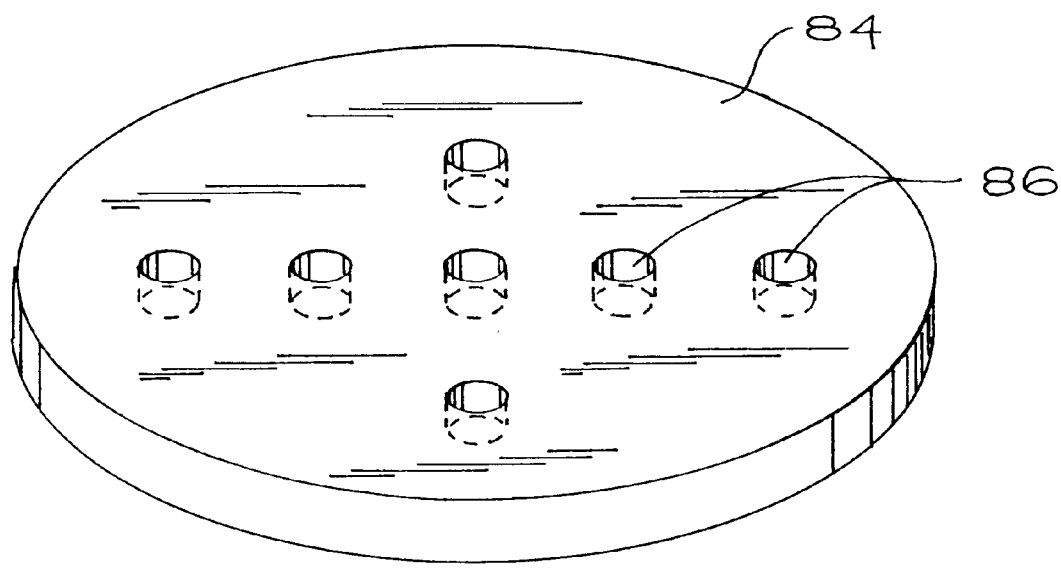
FIG. 11 is a perspective view of a first type of flow plate according to the present invention.

A number of elements and structures which are alternatives to baffles 36, 136 can be used to direct flow in a substantially vertical direction and to reduce or minimize flow tangential to the axis of the roasting vessel 14. Another such flow control element is shown in FIG. 11. The flow plate 84 has a number of apertures 86 therethrough through which air flows from the base 12 of the roaster 2 to the roasting vessel 14. The apertures 86 can be arranged in any pattern across the surface of the flow plate 84. To reduce or minimize tangential, whirlwind, and circular flow into the roasting vessel 14, the flow plate 84 is of sufficient thickness to guide and direct airflow passing through the apertures 86. The size of the apertures 86 also impacts the effectiveness of the apertures 86 to reduce tangential, whirlwind, and circular flow. Therefore, the ratio of plate thickness to aperture diameter is preferably selected such that the plate thickness is approximately the same as the aperture diameter (thereby obstructing or hindering flow from passing through the flow plate 84 unaffected at an angle to the flow plate 84 of approximately 0–45 degrees). More preferably, the plate is thicker and/or the aperture diameters are smaller to obstruct or hinder such flow within 0–60 degrees of the plate surface, and most preferably, the plate is thicker and/or the aperture diameters are smaller to obstruct or hinder such flow within 080 degrees of the plate surface.

Figure 12:
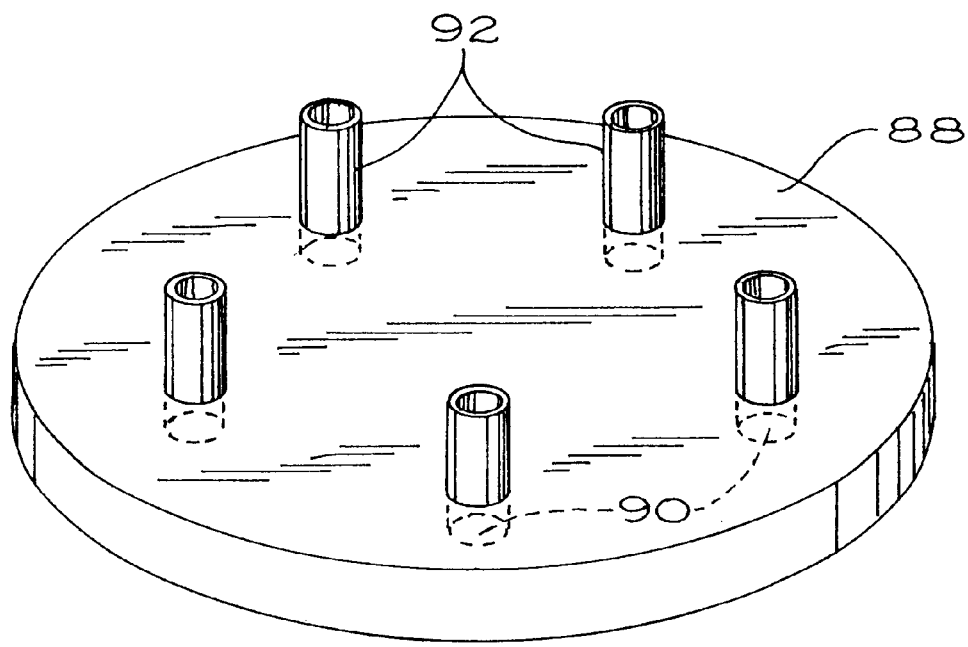
FIG. 12 is a perspective view of a second type of flow plate according to the present invention.

Yet another alternative to the baffles 36, 136 of the preferred embodiment of the present invention is illustrated in FIG. 12. The flow plate 88 illustrated in FIG. 12, like the flow plate 86 in FIG. 11, has a number of apertures 90 therethrough through which air flows from the base 12 of the roaster 2 to the roasting vessel 14. Also as with the flow plate 86 in FIG. 11, the apertures 90 can be arranged in any pattern across the surface of the flow plate 88. Extending from each aperture 88 is a tubular element 92 which acts in much the same manner as the elongated apertures 86 of the flow plate 86 in FIG. 11. Specifically, the relative diameters and lengths of the apertures 88 and tubular elements 92 impact the effectiveness of these elements to reduce tangential, whirlwind, and circular flow. Therefore, the ratios discussed above with respect to the flow plate 86 of FIG. 11 apply in the same manner as the flow plate 88 in FIG. 12. Flow plate 88 has the advantage of producing similar results as flow plate 84, but with significant material and weight savings for the roaster 2.

It will be appreciated by one having ordinary skill in the art that a number of other flow control elements and structures can be used to reduce or remove whirlwind, circular, or tangential flow from airflow entering the roasting vessel 14. For example, a plurality of side-by-side tubular elements (similar to tubular elements 92) can be attached together to form a bank of tubes through which airflow is passed to reduce or remove tangential, circular, and whirlwind flow. Such other elements and structures fall within the spirit and scope of the present invention.

As noted above, there exist several ways in which the baffles 36, 136 can be secured or supported within the roaster 2. Of course, the shape and size of the alternative flow control elements and structures just described will (at least in part) affect the attachment and/or support designs for such flow control elements and structures. Also, it may be necessary in some roaster designs to add elements and structure for guiding airflow from the fan 24 to the baffles, 36, 136, flow plate 84, 88, etc. For example, where the fan 24 is of a type which produces primarily radial flow, airflow from the fan 24 is preferably directed upward along the walls of the plenum housing 30 to the flow control elements or structure (e.g., baffles, flow control plate, and the like). In such a case, a plenum plate (not shown) can be located between the heating element 34 and the flow control elements or structure, and airflow from the fan 24 preferably passes radially around the plenum plate to the flow control elements or structure. Because airflow therefore enters the flow control elements or structure from radially outward positions, baffles 36, 136 are preferably employed as the flow control elements. Baffles 36, 136 are also the preferred flow control elements where the heating element 34 is of a coil type sandwiched between two plates and over which the baffles 36, 136 are located. In both cases, airflow does not or cannot pass from the fan directly upward to the flow control elements or structure, but instead passes around an element to reach the flow control elements or structure. The baffles 36, 136 can accept radial flow, and are therefore preferred flow control elements in such roaster designs.

In order to protect the internal elements within the base 12 from foreign objects and debris, it is highly preferred to secure a base screen 48 made from a heat-resistive material such as metal, composite fiber, etc. over the base opening 38 in a conventional fashion (e.g., via welding, gluing, molding, etc.). The screen 48 is preferably a wire mesh fine enough to catch foreign objects such as coffee bean hulls and bean fragments, but coarse enough to avoid significantly obstructing the flow of air from the baffles 36, 136. Most preferably, a wire mesh having holes ranging in size from 0.08 cm to 0.64 cm is used.

The roasting vessel 14 preferably rests atop the plenum housing 30 and has a substantially open bottom end 50 which is adjacent to the base opening 38 when the roasting vessel 14 is placed upon the base 12. A washer gasket 52 is preferably used to establish and maintain a seal between the roasting vessel 14 and the base 12. The washer gasket 52 is flat and annular in shape, and has a central aperture large enough to not present an obstruction to airflow from the base opening 38 to the open bottom end 50 of the roasting vessel 14. As best shown in FIG. 6, the washer gasket 52 is preferably sandwiched between the plenum housing 30 and the lower edge 54 of the open bottom end 50 of the roasting vessel 14 to establish a fluid-tight seal between these elements. The washer gasket 52 is preferably secured to the top of the plenum housing 30 in a conventional manner, such as by gluing with a high-temperature adhesive, by riveting, by snap-fitting the gasket 52 within a groove or grooves in the top of the plenum housing 30, etc.

Figure 7:
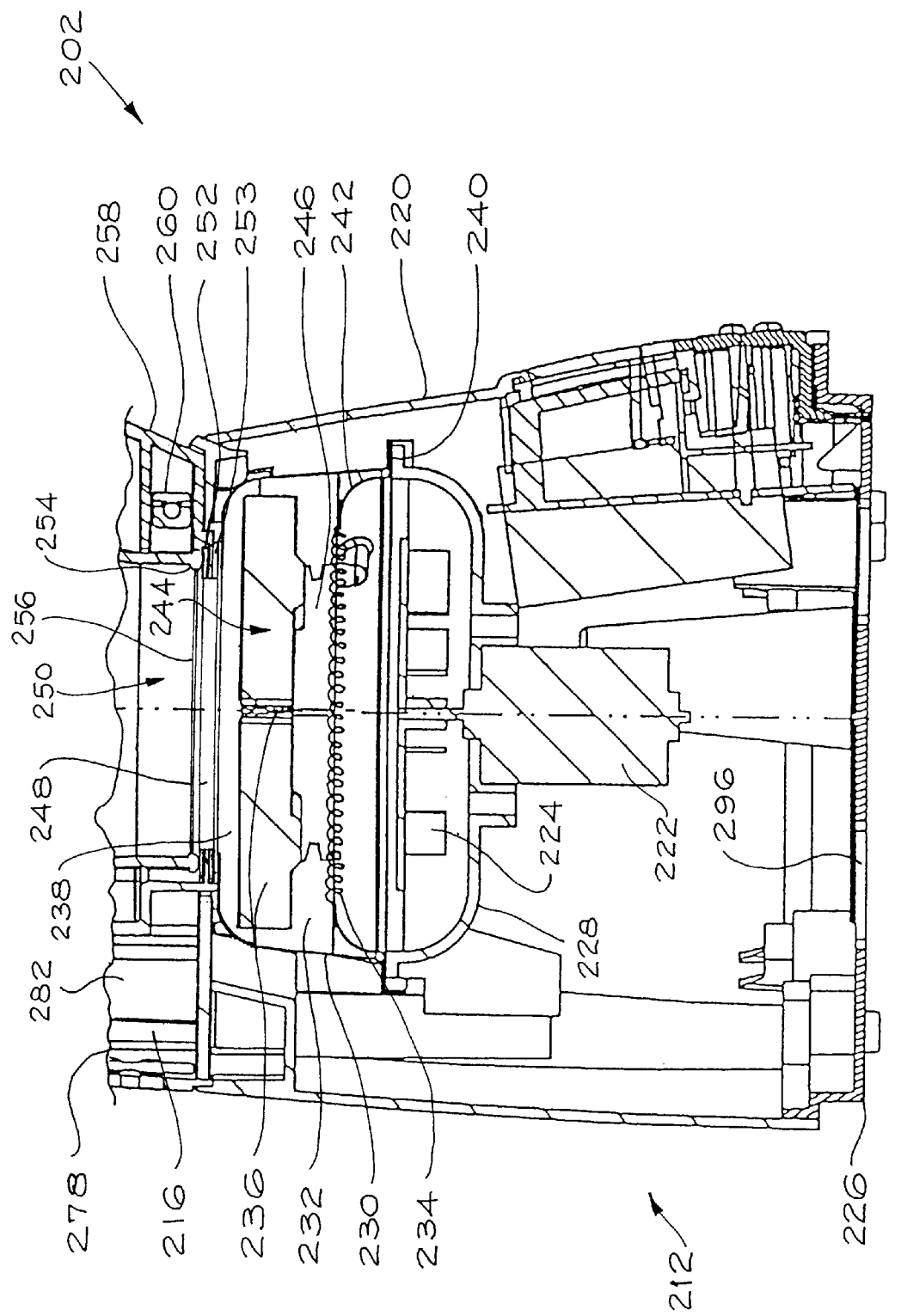
FIG. 7 is an alternate embodiment of the base top shown in FIG. 6.

The preferred base shape is not limited to the shape illustrated in the figures, and can instead be somewhat different. With reference to FIG. 7, the base 212 can have a top 213 which extends over the top 215 of the plenum housing 230, in which case another washer-shaped gasket 253 can be sandwiched between the plenum housing 230 and the inwardly-extending top 213 of the base 212 to establish a fluid-tight seal between these elements. For this alternate arrangement, the washer gasket 252 is preferably secured to the top of the base 212 rather than to the top 215 of the plenum housing 230, and the open bottom end 250 of the roasting vessel 214 rests upon the washer gasket 252.

Figure 8:
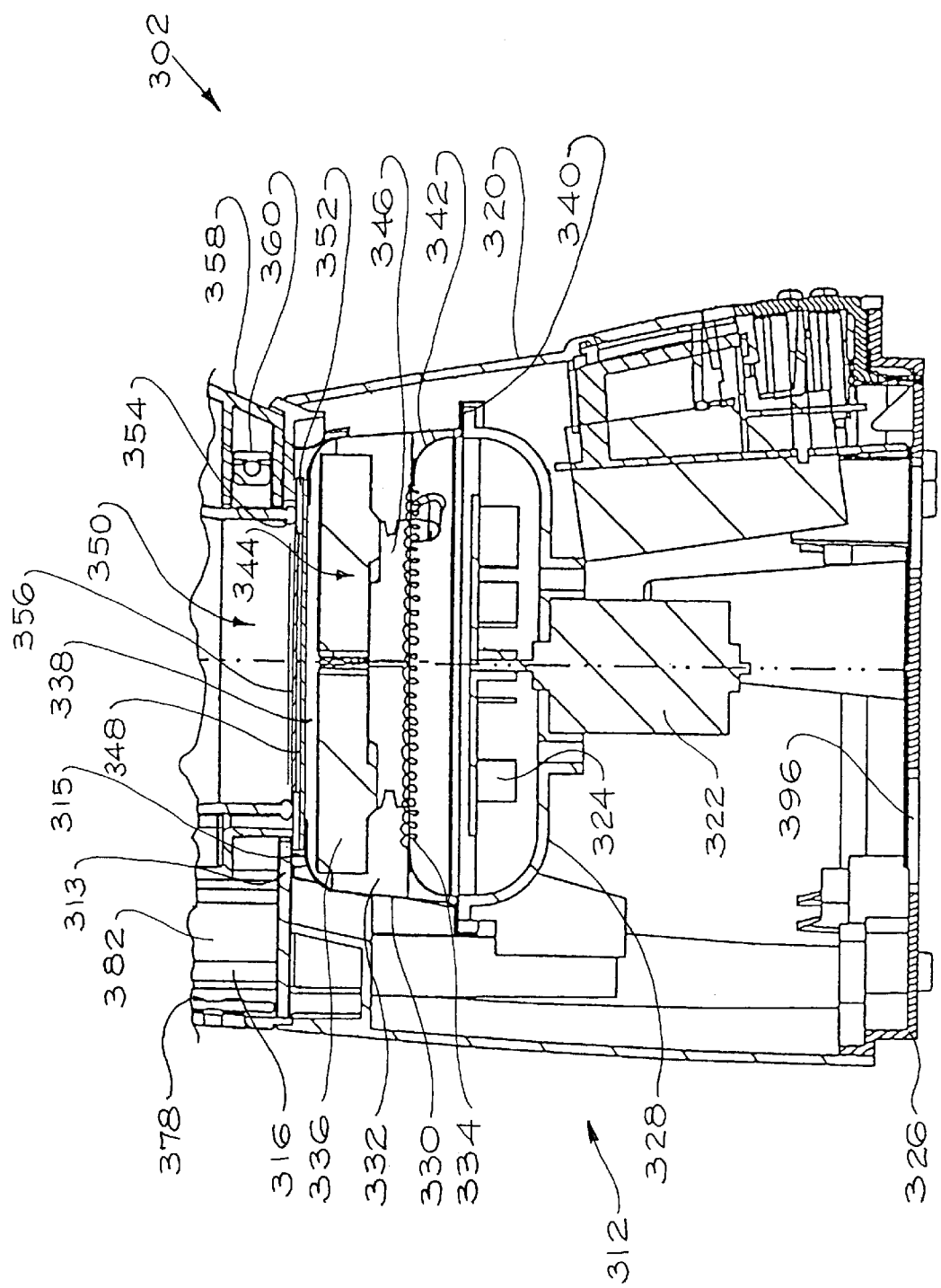
FIG. 8 is yet another alternate embodiment of the base top shown in FIG. 6.

In yet another preferred embodiment illustrated in FIG. 8, the base 312 has a top 313 which extends over the top 315 of the plenum housing 330, and the washer gasket 352 is sandwiched between the plenum housing 230 and the inwardly-extending top 313 of the base 312 to establish a fluid-tight seal between these elements. In this case, the roasting vessel 314 rests upon the washer gasket 352 which extends in a radially inward direction beyond the plenum housing 330 and the base 312. For additional support of the washer gasket 352, the washer gasket 352 can also rest upon the base screen 348 (described below).

The roasting vessel 14 can take a number of shapes other than the preferred generally round cylindrical shape illustrated in FIGS. 1–8 (e.g., oval, square, rectangular, etc.). Also, the narrowed lower section of the roasting vessel 14 shown best in FIGS. 4 and 5 can be eliminated if desired, but is preferred to permit better circulation of the fluidized beans within the roasting vessel 14 and to afford a larger-sized upper vessel volume. The roasting vessel 14 is preferably made of a transparent and heat resistive material such as glass, heat treated glass, or high temperature clear plastic. Of course, other materials such as aluminum, steel, composites, ceramics and other refractory materials can instead be used where a transparent roasting vessel 14 is not required.

By virtue of the flow entering the base opening 38 of the roaster vessel 14 in a substantially upward manner with minimal flow tangential to the axis of the roaster vessel 14 and with minimal whirlwind and swirl flow, airflow and coffee beans travel substantially up the center of the roaster vessel 14 and near to the top of the roaster vessel 14. The air and coffee beans then preferably travel radially outward and fall along the walls of the roaster vessel 14. The restriction shape near the bottom of the roaster vessel 14 creates an area of low pressure near the restriction which helps to guide the falling beans along the periphery of the roaster vessel interior.

Figure 4:
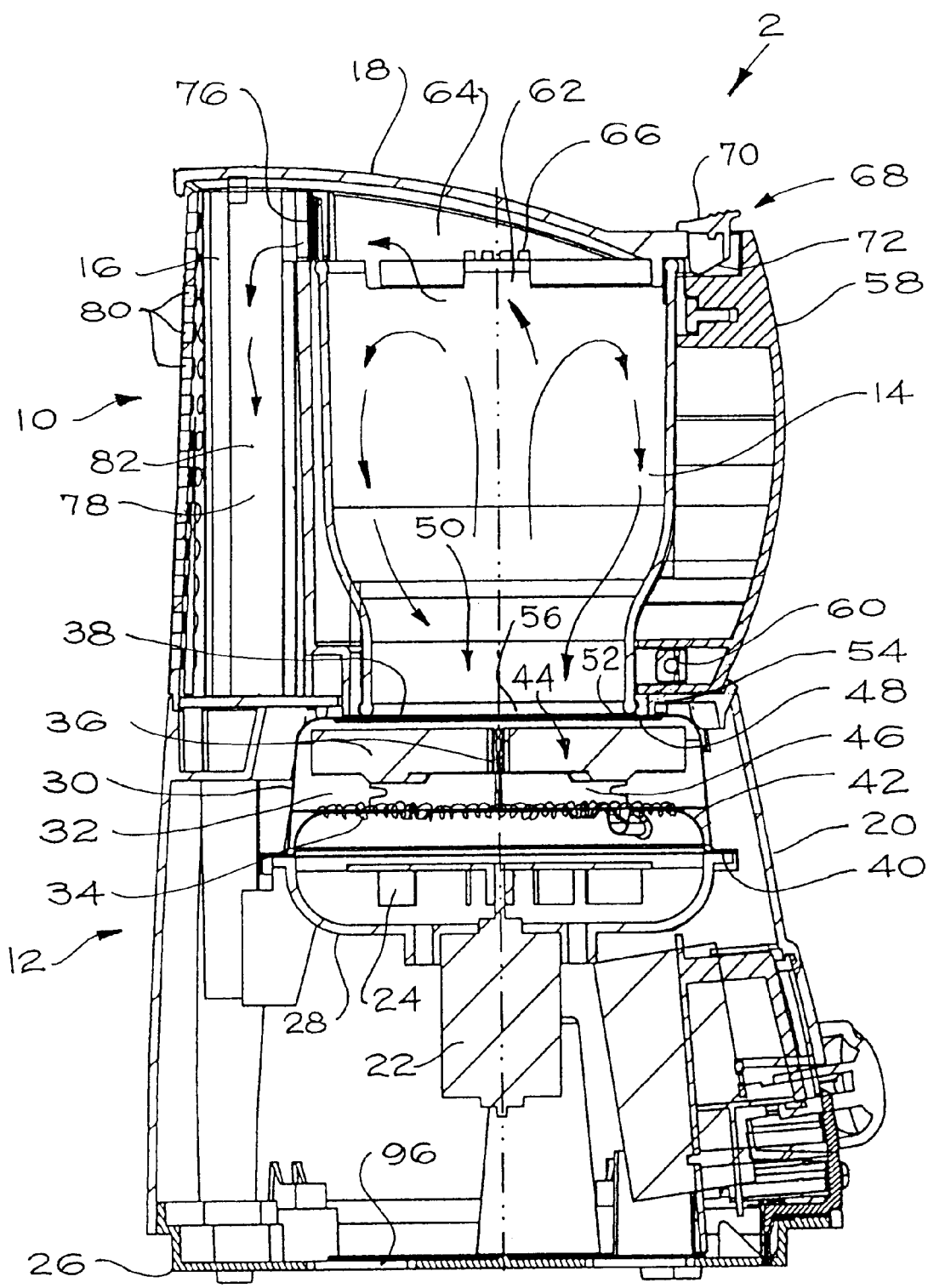
FIG. 4 is an elevational view of the coffee bean roaster shown in FIGS. 1–3 with the roaster cover closed, taken along section 3—3 of FIG. 1.

The resulting flow within the roaster vessel 14 is therefore fountain-like as shown in FIG. 4, with the bed of fluidized beans traveling up the center of the roaster vessel 14 and down the sides of the roaster vessel 14, with minimal to no swirl about the axis of the roaster vessel 14, and with upward and downward flow substantially parallel to the axis of the roaster vessel 14. For best flow results, the velocity of the air generated by the fan 24 is sufficient to push the fluidized coffee beans to an upper region of the roaster vessel 14, but not strong enough to push the coffee beans to the cover 18. Flow velocity is preferably selectable by a user via conventional roaster controls or is programmed into automatic roaster controls, both control types preferably controlling fan speed and power to the fan. It should be noted that although the above-described flow is preferred, it is also possible to reverse the flow so that airflow and coffee beans enter around the periphery of open bottom end 50 of the roaster vessel 14, travel upward along the walls of the roaster vessel 14, and then fall down the center of the roaster vessel 14 to be recirculated into the upward flow. This alternate flow type can be created by blocking airflow from the base 12 in the center of the base opening 38 and/or in the center of the open bottom end 50 of the roaster vessel 14. For example, a plate or other circular-shaped element can cover a central portion of the base screen 48 and/or a central portion of the vessel screen 56 (described below) to block or reduce central flow into the roaster vessel 14.

To prevent debris and foreign material from exiting through the substantially open bottom end 50 of the roasting vessel 14, it is highly preferred to secure thereover in a conventional manner (e.g., via welding, gluing, molding, etc.) a vessel screen 56. Like the base screen 48, the vessel screen 56 is preferably a heat-resistive wire mesh fine enough to catch foreign objects such as coffee bean hulls and bean fragments, but coarse enough to avoid obstructing the flow of air from the base 12. Most preferably, a wire mesh having holes ranging in size from 0.08 cm to 0.64 cm is used. The combined filtering abilities of the vessel screen 56 and the base screen 48 ensure a high degree of protection against matter entering the base 12 before, during, and after the roasting process.

Figure 5:
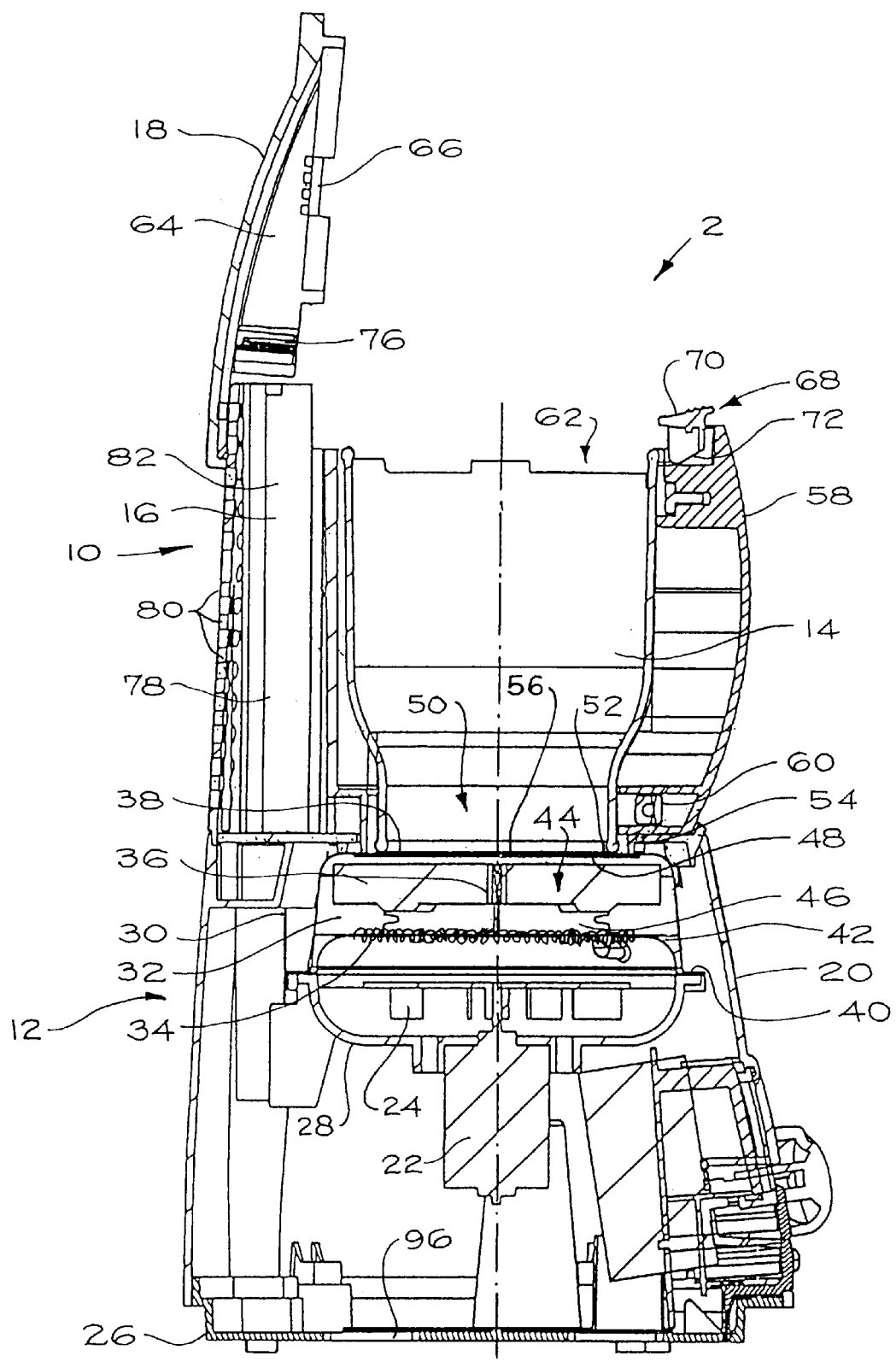
FIG. 5 is an elevational view of the coffee bean roaster shown in FIGS. 1–4 with the roaster cover open, taken along section 4—4 of FIG. 2.

The roasting vessel 14 also preferably has a handle 58 attached thereto for grasping the roasting vessel 14. In the preferred embodiment of the roasting vessel 14 illustrated in FIGS. 1–5, the handle 58 is connected to the roasting vessel 14 at a lower end via a band 60 attached to the handle 58 by a conventional fastener 61 (such as a screw, rivet, spot weld, etc.) and secured about the lower end of the roasting vessel 14. The band 60 can also be used to hold or help hold the vessel screen 56 to the roasting vessel 14 as shown in FIGS. 4 and 5. Specifically, parts of the vessel screen 56 can be wrapped around the lower edge 54 of the roasting vessel 14 and be clamped between the band 60 and the bottom outside wall of the roasting vessel 14. The handle 58 is preferably connected to the upper end of the roasting vessel 14 via conventional fastening devices and methods, and can even be connected with a second band much the same as the band 60 described above. One having ordinary skill in the art will appreciate that several different fastening devices and methods can be used to attach the handle 58 to the roasting vessel 14. Examples of such devices and methods include clips extending from the handle 58 over the upper and/or lower lips of the roasting vessel 14 (see FIGS. 1–5 showing the upper end of the handle 58 secured in this manner), fastener (s) passing through the wall of the roasting vessel 14, high-temperature adhesive, etc. The handle 58 can even be made an integral part of the roasting vessel 14 such as by molding or casting, in which case it is preferred to cover the handle with an insulating material if the roasting vessel 14 is made from a heat-conductive material. These other fastening devices and methods fall within the spirit and scope of the present invention.

Highly preferred embodiments of the present invention include a cover 18 which is pivotable over and away from the substantially open top end 62 of the roasting vessel 14. The cover 18 keeps contents within the roasting vessel 14 from blowing out of the roaster 2 during roaster operation. As shown in FIGS. 1–5, the cover 18 can also have a number of vent grooves 66 therein for permitting limited airflow between the inside of the cover 18 and the outside of the roaster 2. Although a particular placement and number of grooves 66 are shown in the figures, it should be noted that the grooves 66 can instead be replaced by one or more holes, slots, or other aperture types in different and/or the same locations in the cover 18. Any one or more of these apertures can be covered on the inside or outside of the cover 18 by a screen or screens (shown in phantom in FIG. 2). For example, the cover can have vent apertures (not shown) permitting air to escape out of the top of the cover. To prevent hulls, chaff, and other debris from also escaping out of the vent apertures, it is preferred that filters, mesh screening, or another like element(s) cover such apertures. The underside of the cover can also include one or more ribs or other projecting or stepped members for retaining the coffee bean hulls in the roasting vessel 14 (not shown).

The cover 18 also preferably performs the function of exerting a light compressive force upon the roasting vessel 14 to establish a tighter seal between the roasting vessel 14 and the washer gasket 52 upon which it rests. As best shown in FIGS. 4–5, the cover 18 is preferably mounted for rotation about an upper portion of the roaster top 10. To achieve the compressive force just mentioned, the height of the roaster top 10 is therefore selected so that when the cover 18 is closed to its position shown in FIGS. 1 and 4, it forces the roasting vessel 14 against the washer gasket 52. To retain the cover 18 in this position, the roaster 2 is provided with a retaining member 68 preferably located upon the roasting vessel 14, and most preferably located upon the handle 58 of the roasting vessel 14. The retaining member 68 can take many forms sufficient to secure and unsecure the cover 18 into its compressed state over the roasting vessel 14. For example, the retaining member 68 can be a lever 70 biased in the latching position via a latching spring 72 as shown in FIGS. 1–5. The retaining member 68 can instead be a catch operable by the user, a latch of any conventional style, a releasable snap-type seal such as a tight tongue-and-groove arrangement, or any other retention mechanism well known to those skilled in the art. Though not required, the cover 18 can be biased in its open position by a conventional cover spring 74 preferably attached to the cover 18 and/or the roaster top 10.

With particular reference to FIGS. 2–5, it can be seen that the roaster vessel 14 is in fluid communication with the chaff receptacle housing 16 via a vent 76 located beneath the cover 18 when the cover 18 is closed. The vent 76 (which can simply take the form of one or a plurality of slits, holes, or other aperture types which are larger than the vent grooves 66) has apertures which are large enough to permit coffee bean hulls and debris to pass therethrough to the chaff receptacle housing 16 but are small enough to prevent coffee beans from doing the same. The vent 76 is preferably part of a support structure 78 extending from just above the base 12 to the cover 18. At a minimum, the support structure 78 need only be a wall or similar rigid structure sufficient to support the cover 18 above the roasting vessel 14. Preferably however, the support structure 78 defines the chaff receptacle housing 16 as that shown in FIGS. 1–5. In such case, the support structure 78 has a plurality of apertures 80 (holes, grooves, etc.) permitting air which has flowed into the support structure 78 past the vent 76 to exit from the roaster 2.

To address the problem of dust, chaff, and debris often associated with operation of coffee bean roasters, the roaster 2 of the present invention preferably has a removable chaff receptacle 82 of an appropriate size and shape to fit within the chaff receptacle housing 16. The chaff receptacle 82 preferably has a plurality of apertures 94 passing through at least one of its surfaces. The apertures 94 are preferably large enough to permit air to flow therethrough, but are small enough to restrict flow of chaff, hulls, and other debris from passing outside of the chaff receptacle 82 and chaff receptacle housing 16. It will be appreciated by one having ordinary skill in the art that the chaff receptacle 82, like the chaff receptacle housing 16, can be of a number of shapes (e.g., box shaped, tubular, spherical, cone-shaped, etc.) and sizes and can be located in a number of areas with respect to the roaster vessel 14 (e.g., beside the roaster vessel 14, on top of the roaster vessel 14, etc.). In order to further reduce the escape of dust, chaff, and debris from the chaff receptacle 82 and the chaff receptacle housing 16, a conventional filter element (not shown) can be placed within the chaff receptacle 82 and/or between the chaff receptacle 82 and the chaff receptacle housing 16. Where a filter element is used, the filter element preferably at least covers all the holes 80 in the chaff receptacle housing 16.

Figure 3:
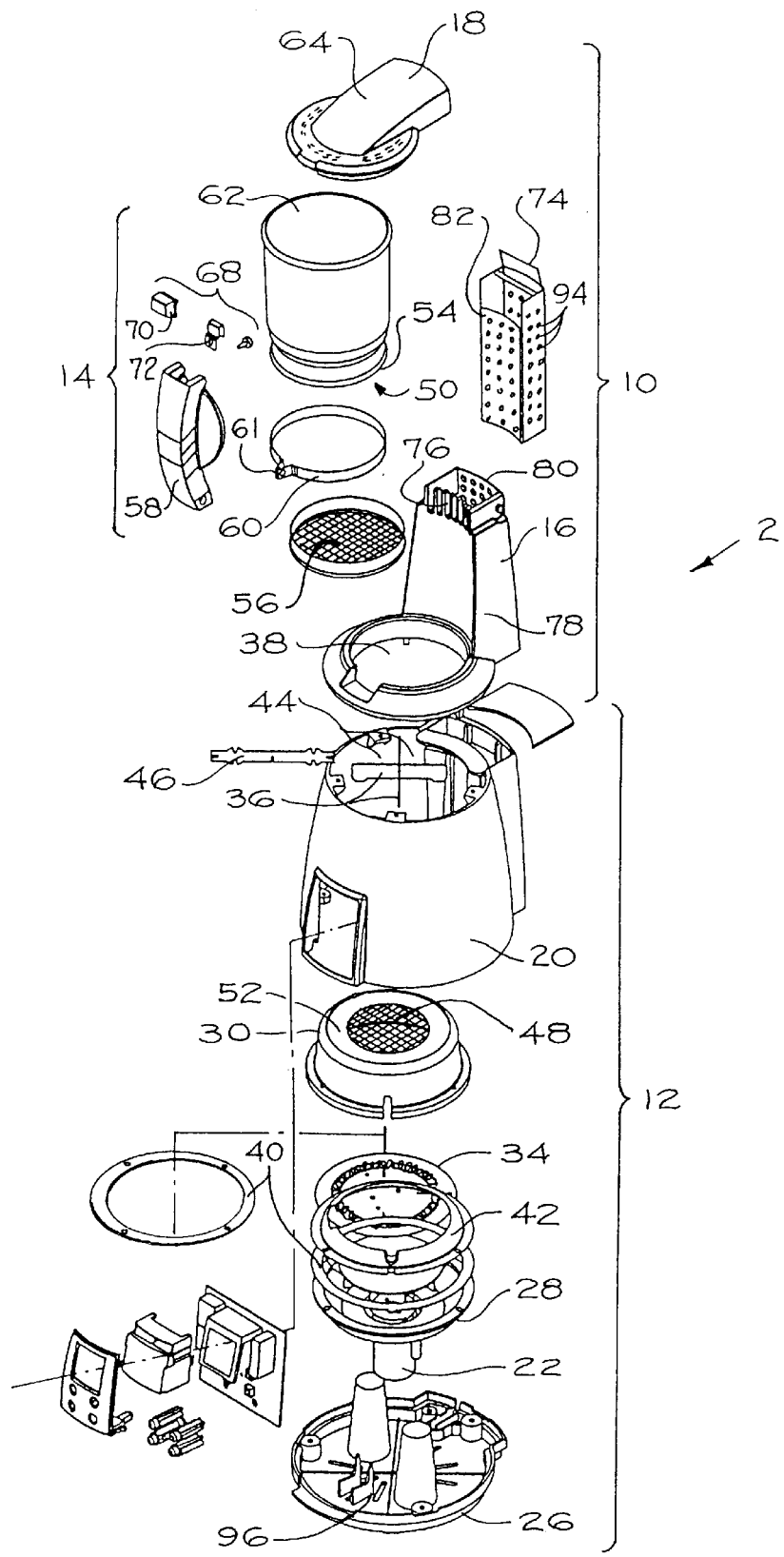
FIG. 3 is an exploded perspective view of the coffee bean roaster shown in FIGS. 1 and 2.

As best shown in FIG. 3, the cover spring 74 is preferably an upper extended portion of the chaff receptacle 82. In such case, the cover spring 74 is more preferably made of a resilient material which is able to deflect and exert a spring force upon the cover 18 when the cover 18 is closed. Most preferably, the chaff receptacle 82 and the cover spring 74 are integral to one another and are made of flexible steel. The preferred shape of the cover spring 74 illustrated in FIG. 3 also serves the purpose of guiding airflow and entrained dust, chaff, and debris from the cover 18 into the chaff receptacle housing 16.

The roaster 2 of the present invention preferably has at least one air intake aperture 96 to permit air to be drawn into the base 12 during roasting operations. More specifically, a number of air intake apertures are preferably located in the bottom 26 of the roaster 2. To reduce the intake of dust, chaff, and debris not only from the environment surrounding the roaster 2 but also from the roaster 2 itself, a conventional filter element (not shown) preferably covers the air intake apertures 96 or at least is located so that substantially all air entering the roaster 2 passes through the filter element.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

For example, the materials making up each element of the coffee bean roaster 2 can be selected from a wide variety of materials. The elements exposed to the greatest heat (such as the elements within the top of the base 12 and particularly within the plenum 32, the roasting vessel 14, and the lower portions of the roaster top 10) should be made of a heat resistant material such as metal, high-temperature plastic or composite, ceramic, glass, etc. However, the other elements of the roaster 2 can be made from virtually any suitable material (high-temperature or otherwise) such as those just mentioned. One having ordinary skill in the art will recognize that alternative materials for each element of the roaster 2 fall within the spirit and scope of the present invention.

Having thus described the invention, what is claimed is:
1. A roaster, comprising:
    a roasting vessel having a substantially open upper end and a substantially open lower end;

a fan located beneath the roasting vessel; and a plurality of baffles located beneath the roasting vessel, each baffle oriented to direct air from the fan in a substantially vertical direction through the lower substantially open end of the roasting vessel.

2. The roaster as claimed in claim 1, wherein the plurality of baffles are vertically oriented to reduce airflow angled with respect to a vertical axis of the roasting vessel.

3. The roaster as claimed in claim 1, wherein the plurality of baffles are arranged in intersecting relationship with one another to define a grid of vertical airflow passages from the fan to the substantially open lower end of the roasting vessel.

4. The roaster as claimed in claim 1, wherein the baffles are arranged in at least two horizontal levels, the baffles on each level being vertically oriented.

5. The roaster as claimed in claim 4, wherein the baffles of one level are misaligned with respect to the baffles of another level.

6. The roaster as claimed in claim 1, further comprising a heater heating air directed from the fan to the substantially open lower end of the roasting vessel.

7. The roaster as claimed in claim 6, wherein the heater is located between the fan and the substantially open lower end of the roasting vessel.

8. The roaster as claimed in claim 1, further comprising a plenum housing the plurality of baffles, the plenum having an opening therein adjacent with the substantially open lower end of the roasting vessel.

9. The roaster as claimed in claim 8, further comprising a heater within the plenum for heating air therein to be directed through the baffles and into the roasting vessel.

10. The roaster as claimed in claim 1, further comprising:

a base upon which the roasting vessel is supported and within which the plurality of baffles and the fan are housed; and a gasket maintaining a fluid-tight seal between the lower substantially open end of the roasting vessel and the base.

11. The roaster as claimed in claim 1, further comprising:

a cover rotatable between a first position covering the substantially open upper end of the roasting vessel and a second position disposed from the substantially open upper end of the roasting vessel.

12. The roaster as claimed in claim 11, wherein the cover is in fluid communication with the open upper end of the roasting vessel and with a chaff receptacle.

13. The roaster as claimed in claim 12, wherein the chaff receptacle is external to the roasting vessel.

14. The roaster as claimed in claim 13, wherein the chaff receptacle is located beside the roasting vessel.

15. The roaster as claimed in claim 13, further comprising a replaceable filter element within the chaff receptacle.

16. A roaster, comprising:

a roasting vessel having an open bottom;

a vessel screen attached to the open bottom of the roasting vessel;

a base upon which the roasting vessel is supported;

a base screen coupled to the base and in fluid communication with the vessel screen and the open bottom of the roasting vessel;

a fan secured within the base and positioned to blow air through the base screen, the vessel screen, the open bottom of the roasting vessel, and into the roasting vessel;

at least one baffle located between the fan and the base screen, the at least one baffle oriented to direct air in a substantially vertical direction through the open bottom of the roasting vessel.

17. The roaster as claimed in claim 16, further comprising a plurality of baffles vertically oriented between the fan and the base screen to direct air from the fan in a direction substantially parallel to a central axis of the roasting vessel.

18. The roaster as claimed in claim 16, further comprising a heater within the base for heating the air blown by the fan.

19. The roaster as claimed in claim 18, wherein the heater is located between the fan and the base screen.

20. The roaster as claimed in claim 16, further comprising a plenum within the base and beneath the vessel screen, the plenum at least in part defining a chamber within which the heater and the at least one baffle are located.

21. The roaster as claimed in claim 20, wherein the plenum has an aperture therein, and wherein the base screen covers the aperture.

22. The roaster as claimed in claim 20, wherein the fan is housed at least partly within the plenum.

23. The roaster as claimed in claim 21, wherein the roasting vessel rests at least partly upon the base screen.

24. The roaster as claimed in claim 23, further comprising a gasket located between the roasting, vessel and the base screen, the gasket maintaining a fluid-tight connection between the plenum and the roasting vessel.

25. The roaster as claimed in claim 16, wherein the roasting vessel rests at least partly upon the base screen.

26. The roaster as claimed in claim 25, further comprising a gasket located between the roasting vessel and the base screen, the gasket maintaining a fluid-tight connection between the base and the roasting vessel.

27. The roaster as claimed in claim 26, wherein the open bottom of the roasting vessel terminates in an edge, and wherein the gasket has a flat washer shape upon which the edge of the roasting vessel rests to establish the fluid-tight connection between the base and the roasting vessel.

28. The roaster as claimed in claim 16, further comprising:

a top coupled to the base; and a cover coupled for pivotal movement to the top;

wherein the roasting vessel has an open top, the cover being pivotable between a first position where the cover covers the open top of the roasting vessel and a second position where the open top of the roasting vessel is uncovered.

29. The roaster as claimed in claim 28, wherein the roasting vessel has an interior and wherein the cover is in fluid communication with the interior of the roasting vessel and with a chaff receptacle adjacent to the roasting vessel.

30. The roaster as claimed in claim 28, wherein the top has a chaff collector for collecting chaff from the roasting vessel.

31. The roaster as claimed in claim 30, further comprising a removable filter received within the chaff collector.

32. A roaster, comprising:

a fan producing airflow;

a heater in fluid communication with the fan;

a roasting vessel receiving the airflow produced by the fan and heated by the heater, the roasting vessel having a longitudinal axis;

at least one tangential flow reducing element located upstream of the roasting vessel, the at least one tangential flow reducing element adapted to reduce flow tangential to the axis of the roasting vessel from airflow entering the roasting vessel.

33. The roaster as claimed in claim 32, wherein the at least one tangential flow reducing element is at least one baffle.

34. The roaster as claimed in claim 32, wherein the at least one tangential flow reducing element is a flowplate having at least one aperture therethrough through which the airflow passes.

35. The roaster as claimed in claim 33, wherein a flowplate has a thickness and wherein at least one aperture of the flowplate has a diameter which is no larger than the thickness of the flowplate.

36. The roaster as claimed in claim 33, wherein at least one aperture of the flowplate is dimensioned to restrict passage of flow incident to a flowplate at an angle of between 0 and 45 degrees.

37. The roaster as claimed in claim 33, wherein at least one aperture of a flowplate is dimensioned to restrict passage of flow incident to the flowplate at an angle of between 0 and 60 degrees.

38. The roaster as claimed in claim 33, wherein at least one aperture of a flowplate is dimensioned to restrict passage of flow incident to the flowplate at an angle of between 0 and 80 degrees.

39. The roaster as claimed in claim 32, wherein the at least one tangential flow reducing element is a plurality of tubes extending substantially parallel to the longitudinal axis of the roasting vessel.

40. The roaster as claimed in claim 38, wherein the plurality of tubes are each attached at one end through a flowplate.

41. The roaster as claimed in claim 32, further comprising a plenum plate around which the airflow passes to the at least one tangential flow reducing element, the plenum plate located between the fan and the at least one tangential flow reducing element.

42. The roaster as claimed in claim 32, further comprising a roasting vessel cover removably covering a top opening in the roasting vessel.

43. The roaster as claimed in claim 32, further comprising a chaff receptacle in fluid communication with a top opening in the roasting vessel.

44. The roaster as claimed in claim 42, wherein a chaff receptacle is in fluid communication with a top opening in the roasting vessel via a roasting vessel cover removably covering the top opening of the roasting vessel.

45. The roaster as claimed in claim 42, wherein a chaff receptacle has a lip extending from an entrance into the chaff receptacle, the lip positioned to guide air into the chaff receptacle from the top opening of the roasting vessel.

* * * * *